(12) United States Patent
Lin

(10) Patent No.: US 9,511,500 B2
(45) Date of Patent: Dec. 6, 2016

(54) CUTTING TOOL

(71) Applicant: BOR SHENG INDUSTRIAL CO., LTD., Taichung (TW)

(72) Inventor: Shih-Chang Lin, Taichung (TW)

(73) Assignee: BOR SHENG INDUSTRIAL CO., LTD., Taichung (TW)

( * ) Notice: Subject to any disclaimer, the term of this patent is extended or adjusted under 35 U.S.C. 154(b) by 186 days.

(21) Appl. No.: 13/962,019

(22) Filed: Aug. 8, 2013

(65) Prior Publication Data
US 2015/0040407 A1   Feb. 12, 2015

(51) Int. Cl.
| B26B 13/04 | (2006.01) |
| B26B 13/28 | (2006.01) |
| B26B 13/16 | (2006.01) |
| A01G 3/02 | (2006.01) |

(52) U.S. Cl.
CPC ............. *B26B 13/16* (2013.01); *A01G 3/02* (2013.01); *B26B 13/04* (2013.01); *B26B 13/28* (2013.01)

(58) Field of Classification Search
CPC .......... A01G 3/02; B26B 13/16; B26B 13/04; B26B 13/28
USPC ............... 30/236, 237, 238, 240, 245, 249, 250,30/251, 252, 260, 261, 262; 411/209, 210, 411/211, 166
See application file for complete search history.

(56) References Cited

U.S. PATENT DOCUMENTS

| 317,637 | A | * | 5/1885 | Gesford, Jr. ................... 301/116 |
| 4,189,804 | A | * | 2/1980 | Flowerday ............. A47B 95/02 16/419 |
| 5,527,329 | A | * | 6/1996 | Gharibian .......... A61B 17/3213 30/151 |
| 5,599,351 | A | * | 2/1997 | Haber ................ A61B 17/3211 30/151 |
| 6,000,307 | A | * | 12/1999 | Aamodt ........................... 83/13 |
| 6,153,331 | A | * | 11/2000 | Brantley ............. H01M 2/1005 16/423 |
| 7,186,067 | B2 | * | 3/2007 | Leblanc .................. F16B 23/00 30/335 |
| 7,328,513 | B1 | * | 2/2008 | Yang ....................... B26B 17/02 30/178 |
| 8,327,548 | B2 | * | 12/2012 | Ronan ..................... B26B 17/00 30/175 |
| 2007/0256308 | A1 | * | 11/2007 | Lin .......................... A01G 3/02 30/231 |
| 2011/0061249 | A1 | * | 3/2011 | Ma .......................... A01G 3/02 30/520 |
| 2011/0283545 | A1 | * | 11/2011 | Wu .......................... A01G 3/02 30/250 |

OTHER PUBLICATIONS

Definition of "Circular" accessed at http://www.merriam-webster.com/dictionary/circular on Dec. 21, 2015.*

* cited by examiner

*Primary Examiner* — Stephen Choi
*Assistant Examiner* — Evan MacFarlane
(74) *Attorney, Agent, or Firm* — Raymond Y. Chan; David and Raymond Patent Firm

(57) ABSTRACT

A cutting tool includes an upper handle, a lower handle, a blade, at least one quick release device and a connection part. The cutting tool features on that both the blade and the connection part are pivoted quickly by the quick release device without any special tools. When the cutting tool is in an open state or a closed state, the quick release device disposed on the connection part is switched and moved in a circular part on one end of the blade so as to cut.

6 Claims, 10 Drawing Sheets

CUTTING TOOL

BACKGROUND OF THE INVENTION

1. Field of the Invention

The present invention relates to a cutting tool, especially to a cutting tool in which pivots and pivot parts are assembled and disassembled quickly.

2. Description of Related Art

Refer to Taiwanese Pat No. M312405, a latch for handle of pruning shear is revealed. The latch for handles of pruning shears includes a first handle, a second handle, a blade, a connecting arm and a locking member. A cutting board is disposed on an end of the first handle while the second handle is pivotally connected to the first handle. The blade is pivoted and fixed on the first handle and is corresponding to the cutting board. A locking projecting block is arranged at a rear end of the blade. The connecting arm is pivoted between the second handle and the rear end of the blade. The locking member is formed by a pivot part extended from an inner surface of a pull grip with a locking slot arranged at a front side thereof. The pivot part is disposed with at least one elastic piece. The pivot part is mounted and fixed in a slot on an inner side surface of the second handle so that the elastic piece is against an inner wall of the slot.

The above shear is a kind of lever suitable for cutting hard materials such as metal sheets, branches, etc. In order to increase the strength of the handle, the shears available now include handles made from metal such as aluminum alloy with an improved hardness and not easy to get damaged. After being used for a long period of time, the blade on the front end of the shears is usually damaged first and the whole shear is replaced by a new one. This is a kind of waste, not environmental friendly. Thus some manufacturers have designed the shears/scissors with replaceable blades. However, additional tools are required to replace the blade and components used for pivoting the blade have different sizes. It's time consuming and inconvenient for users to find out suitable tools and remove the blade.

Thus there is room for improvement and a need to provide a pivoting component easily assembled and disassembled without any additional tools. The pivoting component is a quick release device with multiple functions such as quick disassembling and positioning

SUMMARY OF THE INVENTION

Therefore it is a primary object of the present invention to provide a cutting tool that includes a quick release device disposed on a connection part and moved in a circular part on one end of a blade when an upper handle is changed from an open state to a closed state. The cutting tool of the present invention includes an upper handle, a lower handle, a blade, a first pivot, a second pivot, at least one quick release device and a connection part connecting the blade and the lower handle. The quick release device allows users to achieve quick pivoting and connection without any tools. The quick release device is used to not only connect the blade to the upper handle pivotally but also connect the connection part and the blade. The connection part is connected to a circular part of the blade, used as a driving device. One end of the connection part is pivotally connected to the lower handle to form a pivot point. The cutting tool features on that the quick release device on the connection part is moved in the circular part on one end of the blade so as to cut when the upper handle is changed from an open state to a closed state.

In the present invention, the quick release device includes a first quick release device and a second quick release device. Each quick release device consists of a shaft component and a handle. A threaded part is disposed on one end of the shaft component while an enlarged part is arranged at the other end of the shaft component. A circular slot is arranged around the circumference of the enlarged part and a pair of holes is radially mounted on the enlarged part. The handle is formed by bending of a rod and two symmetrical assembly parts are disposed on two curved rear ends of the handle respectively. The assembly parts are mounted in an inner diameter of the holes of the enlarged part so that the handle swings around the enlarged part.

The upper handle is composed of a holding part, a jaw part, a first pivot part, a first mounting hole and a receiving part. The holding part is wrapped by an elastic pad and the jaw part is used to receive pressure during the cutting of the blade.

The jaw part extends from a front end to a rear end of the upper handle to form a hollow space with two walls. The hollow space is arranged with the first pivot part for connecting the upper handle and the lower handle. The first pivot passes through the first pivot part, used as a pivot point for opening and closing the upper handle and the lower handle. The first mounting hole is mounted above the first pivot part. A concave part and a limiting part are disposed on an outer surface of the first mounting hole.

The receiving part is a recess with a receiving space and having a first set of projecting ribs and a second set of projecting ribs. A cleaner is received in the receiving part.

The lower handle includes a handle part, a second pivot part, a third pivot part and a receiving slot. The handle part is arranged with an upper receiving part and a lower receiving part. The second pivot part is disposed on a front end of the lower handle and is used for being connected to the first pivot part of the upper handle. The third pivot part is arranged behind the second pivot hole and is aligned with an axial hole of the connection part to be passed through by a second pivot. The receiving slot is mounted on the upper receiving part and used for mounting a set of locking device. The locking device includes a first pushing block and a second pushing block. A rib part is projecting from one end surface of the first pushing block while one end surface of the second pushing block is arranged with a mounting projection. The rib part of the first pushing block is sleeved into the mounting projection of the second pushing block.

The blade consists of a cutting surface, an insertion hole, a circular part, and a hook part. The cutting surface is used for cutting. The insertion hole is mounted on a middle part of the blade and is pivotally connected to the first mounting hole of the upper handle. The circular part is a hollow window formed by a plurality of connected circles, arranged at the rear part of the blade and used for restrict the displacement of a shaft component of the second quick release device. The hook part is disposed on a rear end of the blade. When the upper handle and the lower handle are in a closed state, the hook part is locked by the locking device for preventing the blade from opening.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 10-1 is partial enlarged cross sectional view of the embodiment in FIG. 10 according to the present invention.

DETAILED DESCRIPTION OF THE PREFERRED EMBODIMENT

Please refer to following embodiments for details, features and effects of the present invention.

Figure 1:
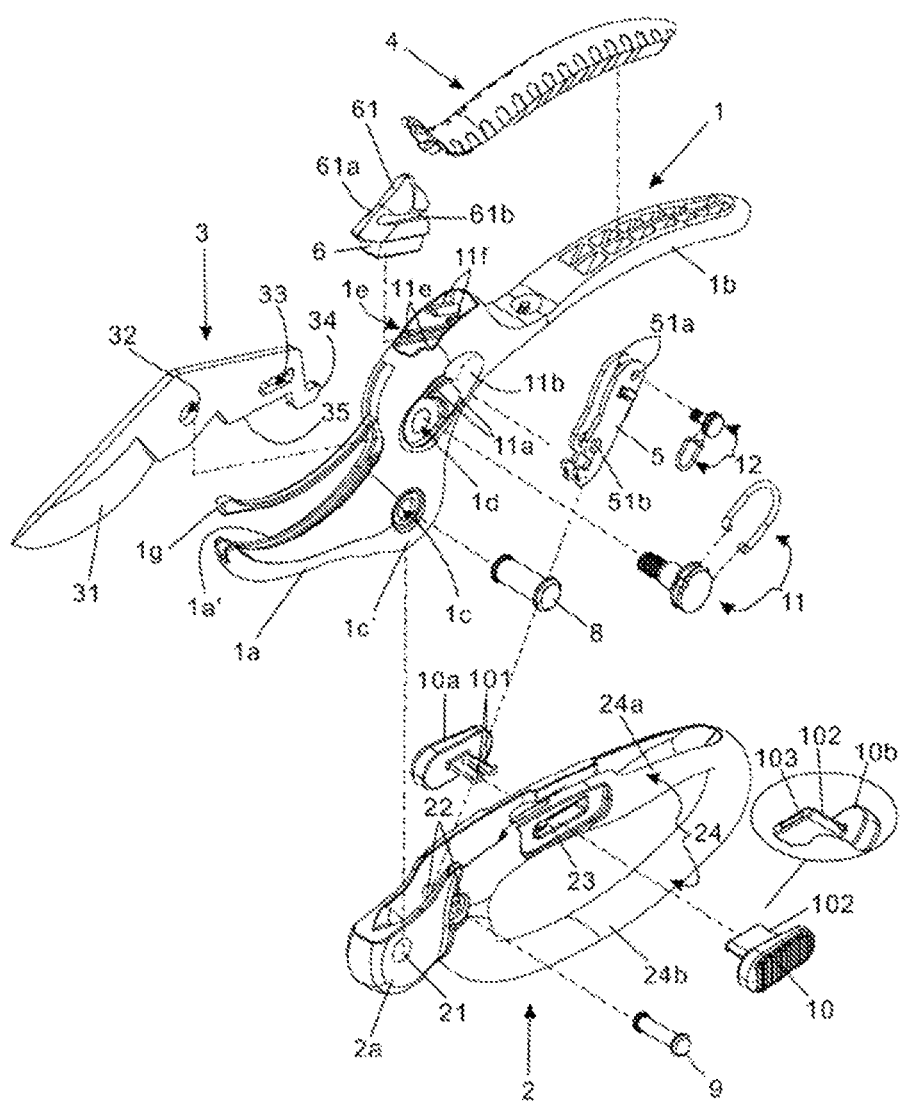
FIG. 1 is an explosive view of an embodiment according to the present invention.

Refer to FIG. 1, an explosive view of an embodiment showing connection of respective components is revealed. A cutting tool of the present invention include an upper handle 1, a lower handle 2, a blade 3, a first pivot (shaft) 8, a second pivot 9, a first quick release device 11, a second quick release device 12, and a connection part 5 connecting the blade 3 and the lower handle 2.

The upper handle 1 consists of a holding part 1b, a jaw part 1a, a first pivot part 1c, a first mounting hole 1d and a receiving part 1e. The holding part 1b is wrapped by an elastic pad 4. The jaw part 1a extends from a front end to a rear end to form a hollow space 1c' having two walls. The hollow space 1c' is mounted with the first pivot part 1c and the first mounting hole 1d therein. The first pivot part 1c penetrating the hollow space 1c' transversely is aligned with a second pivot part 21 of the lower handle 2, allowing the first pivot 8 to pass through and form a first pivot point A between the upper handle 1 and the lower handle 2. A slot 1a' is disposed on a front end of the jaw part 1a and is used for receiving a pad 1g. The pad 1g is an elastic body used as a buffering structure for a cutting surface 31 of the blade 3. The first mounting hole 1d is arranged at the upper rear side of the first pivot part 1c and is penetrating through the hollow space 1c' transversely. A concave part 11b and a limiting part 11a are disposed on an outer surface of one side of the first mounting hole 1d.

The a lower handle 2 is composed of an assembly part 2a, a handle part 24, a second pivot part 21, a third pivot part 22 and a receiving slot 23. The assembly part 2a is disposed on a front end of the lower handle 2 and the second pivot part 21 is arranged at the assembly part 2a. The second pivot part 21 is aligned with the first pivot part 1c of the upper handle 1. Then the first pivot 8 passing through the first pivot part 1c and the second pivot part 21 is defined as the first pivot point A. A third pivot part 22 is located between the assembly part 2a and the handle part 24 and is aligned with a second axial hole 51b of the connection part 5. Then a second pivot 9 passing through the third pivot part 22 and the second axial hole 51b is defined as a second pivot point B. The handle part 24 is arranged at a rear side of the lower handle 2 and having an upper receiving part 24a and a lower receiving part 24b integrated with each other. The receiving slot 23 is mounted on the upper receiving part 24a and used for mounting a set of locking device 10. The locking device 10 includes a first pushing block 10a and a second pushing block 10b. A rib part 101 is projecting from one end surface of the first pushing block 10a while one end surface of the second pushing block 10b is arranged with a mounting projection 102. The rib part 101 of the first pushing block 10a is just sleeved into a receiving nozzle 103 of the mounting projection 102. After the rib part 101 of the first pushing block 10a being aligned with the receiving nozzle 103 of the second pushing block 10b, the rib part 101 and the receiving nozzle 103 are locked with each other in the receiving slot 23. Thus the locking device 10 has anterior/posterior movement in the receiving slot 23 and the position is defined as a displacement D. The locking device 10 is used as a safety guard for preventing the blade 3 from moving.

The blade 3 consists of the cutting surface 31, an insertion hole 32, a circular part 33, a hook part 34 and a push part 35. The cutting surface 31 is used for cutting and the insertion hole 32 is disposed on a middle part of the blade. A shaft component 111 of the first quick release device 11 pass through the first mounting hole 1d of the upper handle 1 and then the insertion hole 32 so as to pivot the blade 3 on the upper handle 1 and the position is defined as the third pivot point C. The circular part 33 is a hollow window formed by a plurality of connected circles, arranged at the rear part of the blade 3 and used for displacement of a shaft component 121 of the second quick release device 12 pivoted on the connection part 5. The hook part 34 is set on a rear end of the blade 3. When the upper handle 1 and the lower handle 2 are in a closed state, the hook part 34 is locked and fixed by the locking device 10. Thus a safety switch used for preventing opening of the blade 3 is formed.

Figure 2:
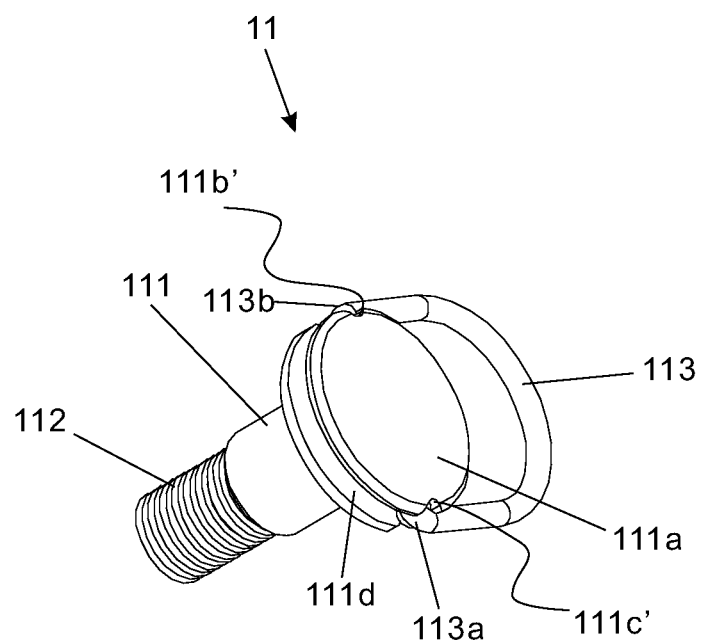
FIG. 2 is a perspective view of a quick release device of an embodiment according to the present invention.
Figure 3:
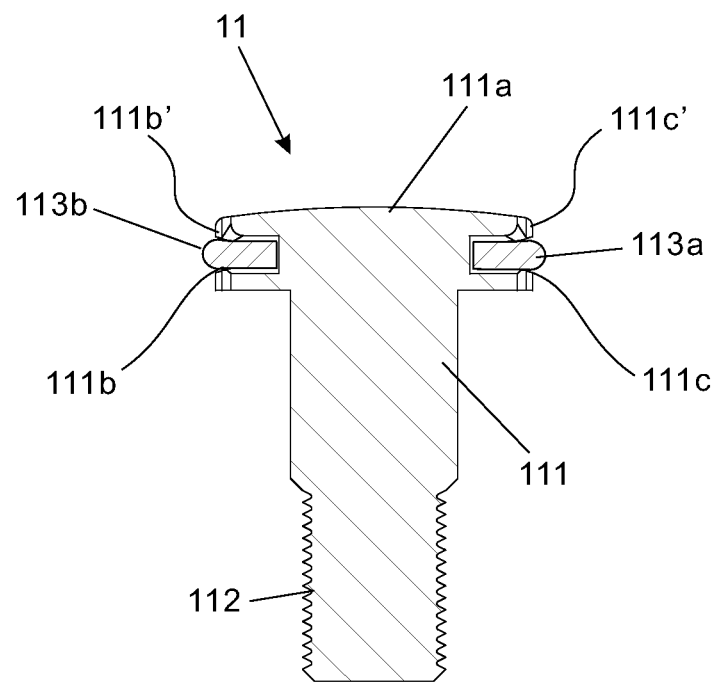
FIG. 3 is a cross sectional view of a quick release device of an embodiment according to the present invention.
Figure 4:
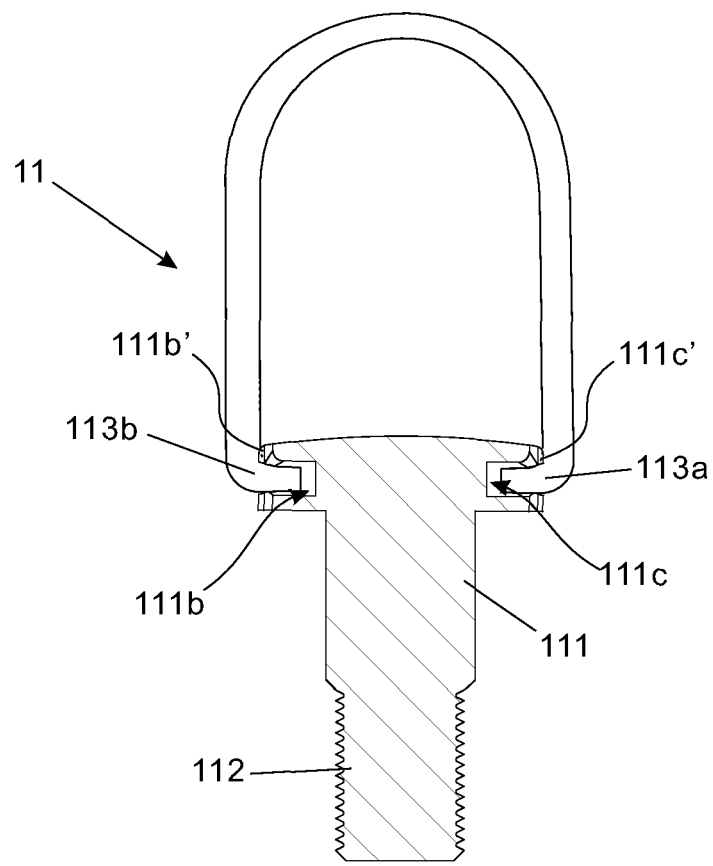
FIG. 4 is a cross sectional view of a quick release device of an embodiment according to the present invention.

Refer to FIG. 2, FIG. 3 and FIG. 4, the present invention features on that a component that connects the blade 3 and the connection part 5 pivotally is a quick release device. In this embodiment, there are two quick release devices, a first quick release device 11 and a second quick release device 12. The first quick release device 11 includes a shaft component 111 and a handle 113. As shown in FIG. 2, a perspective view of the first quick release device 11 is revealed. One end of the shaft component 111 is disposed with a threaded part 112 while the other end thereof is an enlarged part 111a. A circular slot 111d is arranged around the circumference of the enlarged part 111a and a pair of symmetrical holes 111b, 111c is arranged radially at the enlarged part 111a. Moreover, a recess 111b', 111c' is arranged at an outer end of the holes 111b, 111c respectively. The handle 113 is formed by bending of a long rod. Two symmetrical assembly parts 113a, 113b are disposed on two curved rear ends of the handle 113 respectively. The assembly parts 113a, 113b are mounted in an inner diameter of the holes 111b, 111c of the enlarged part 111a so that the handle 113 swings around the enlarged part 111a. The movement of the handle 113 is shown in FIG. 3, FIG. 4, FIG. 8 and FIG. 9.

As shown in FIG. 4, the shaft component 111 of the first quick release device 11 is mounted into the first mounting hole 1d and the handle 113 is sticking up in the enlarged part 111a. Now the assembly parts 113a, 113b are extended due to the elasticity. But the assembly parts 113a, 113b are retracted after entering the recesses 111b', 111c'. Thus the handle 113 is temporarily in a sticking state. Continue to rotate the handle 113 and the threaded part 112 of the shaft component 111 is engaged with threads preset inside the first mounting hole 1d until the enlarged part 111a is against an outer surface of the first mounting hole 1d. Then pull the handle 113 downward and the assembly parts 113a, 113b are expanded by the outer diameter of the enlarged part 111a and then are turned back to be in an inner bottom end of the holes 111b, 111c. At this moment, the outer end of the assembly parts 113a, 113b are limited by the circumference of the enlarged part 111a and located in the circular slot 111d. Thus one end of the handle 113 is fixed on the limiting part 11a while the rear end of the handle 113 is mounted in the concave part 11b, without being released from the limiting part 11a easily.

The step of assembling the blade 3 on the upper handle 1 is completed. On the other hand, once users intend to remove the blade 3 from the upper handle 1, the handle 113 is pulled upward from the concave part 11b and sticking up again. Then users rotate the handle in opposite direction and further drive the shaft component 111 to rotate. Thus the threaded part 112 of the shaft component 111 is released from the threads preset inside the first mounting hole 1d. Finally, the first quick release device 11 is completely removed from the first mounting hole 1d and the blade 3 is released from the upper handle 1.

Figure 5:
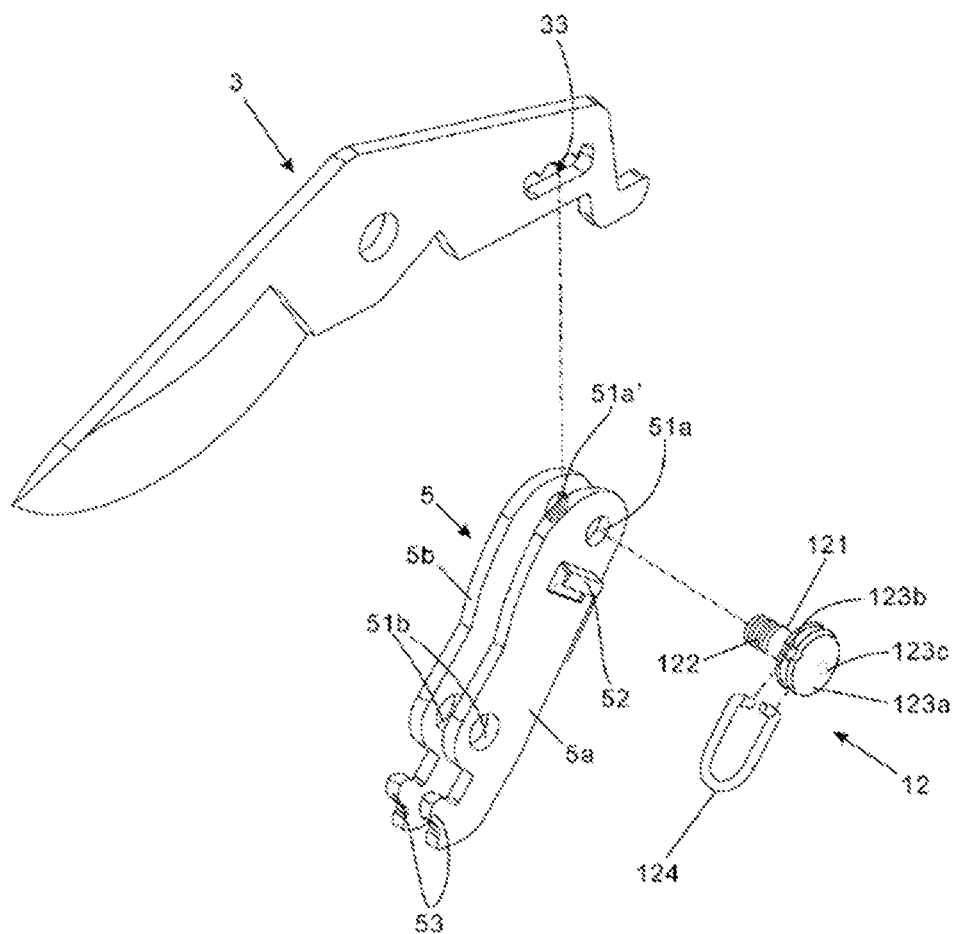
FIG. 5 is an explosive view of a second quick release device and a connection part of an embodiment according to the present invention.

Refer to FIG. 5, the second quick release device 12 is similar to that of the first quick release device 11. In the embodiment, the second quick release device 12 is passed through a first axial hole 51a of the connection part 5 and connected to the circular part 33 of the blade 3. The second quick release device 12 is for driving, used as an insertion pin that is inserted through the circular part 33 of the blade 3. The connection part 5 is an integrated part formed by bending a plate and having a first surface 5a and a second surface 5b arranged symmetrically. One end of the first surface 5a and the second surface 5b is disposed with the first axial hole 51a respectively while the other end of the first surface 5a and the second surface 5b is arranged with a second axial hole 51b respectively. A mounting 53 is formed integratedly on the rear end of the connection part 5 while a locking part 52 is set on the first surface 5a. An inner threads 51a' is formed on an inner surface of one axial hole 51a. A handle 124 of the second quick release device 12 is mounted into holes 123b, 123c of an enlarged part 123a. While assembling the blade 3 and the connection part 5, the shaft component 121 is inserted through the first axial hole 51a and connected to the circular part 33 of the blade 3. Rotate the handle 124 and a threaded part 122 of the second quick release device 12 is engaged with the inner threads 51a' of the axial hole 51a. Stop rotation until a bottom surface of the enlarged part 123a is against the first surface 5a of the connection part 5. Next pull the handle 124 downward on the locking part 52 so that the second quick release device 12 is positioned. Thus the assembly of the blade 3 to the connection part 5 is completed. Moreover, the inner surface of the first axial hole 51a can also be without the inner threads 51a'while the second quick release device 12 is without the threaded part 122 correspondingly. The second quick release device 12 can still have the same functions of positioning and pivoting.

The receiving part 1e is a recess with a receiving space and having a first set of projecting ribs 11e and a second set of projecting ribs 11f so as to load a cleaner 6. The cleaner 6 is a block made from wool felt or other materials for cleaning and is attached under an assembly block 61. The assembly block 61 is disposed with two slots 61a, 61b that are corresponding to and aligned with the second set of ribs 11f. Thus the assembly block 61 is sliding and receiving in the receiving part 1e. The first set of projecting ribs 11e is for holding the cleaner 6 while the second set of projecting ribs 11f is for positioning the assembly block 61. Thereby the cleaner 6 is put inside the receiving part 1e and users can use the cleaner 6 to clean the blade 3 periodically.

The assembly part 2a is located between the second pivot part 21 and the third pivot part 22 of the lower handle 2. The assembly part 2a can be used to receive an elastic member 13 that is a long spiral spring. One end of the elastic member 13 is against the assembly part 2a and connected to the mounting part 53 of the connection part 5 while the other end thereof is against the push part 35 of the blade 3. Thereby the blade 3 received in the jaw part 1a can be pushed upward by the elastic member 13 so as to make the blade 3 in an open state.

Figure 6:
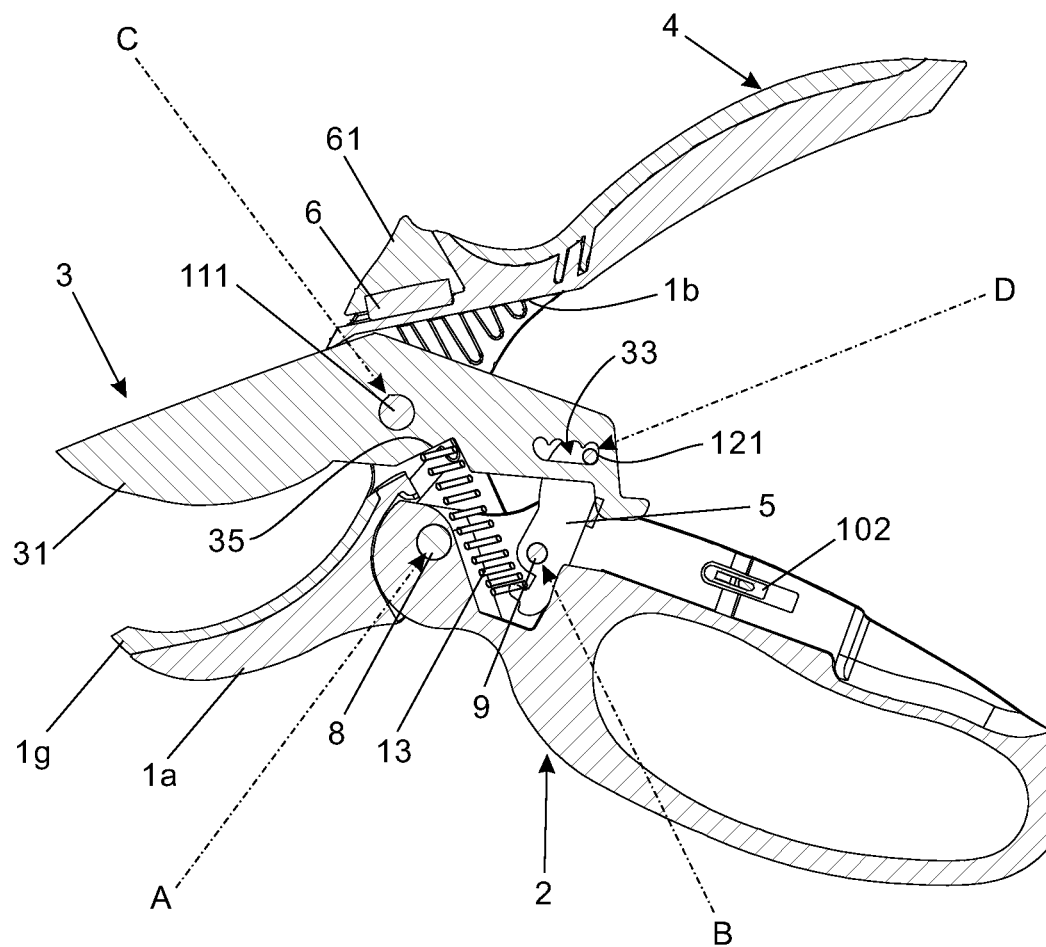
FIG. 6 is an embodiment in an open state according to the present invention.
Figure 7:
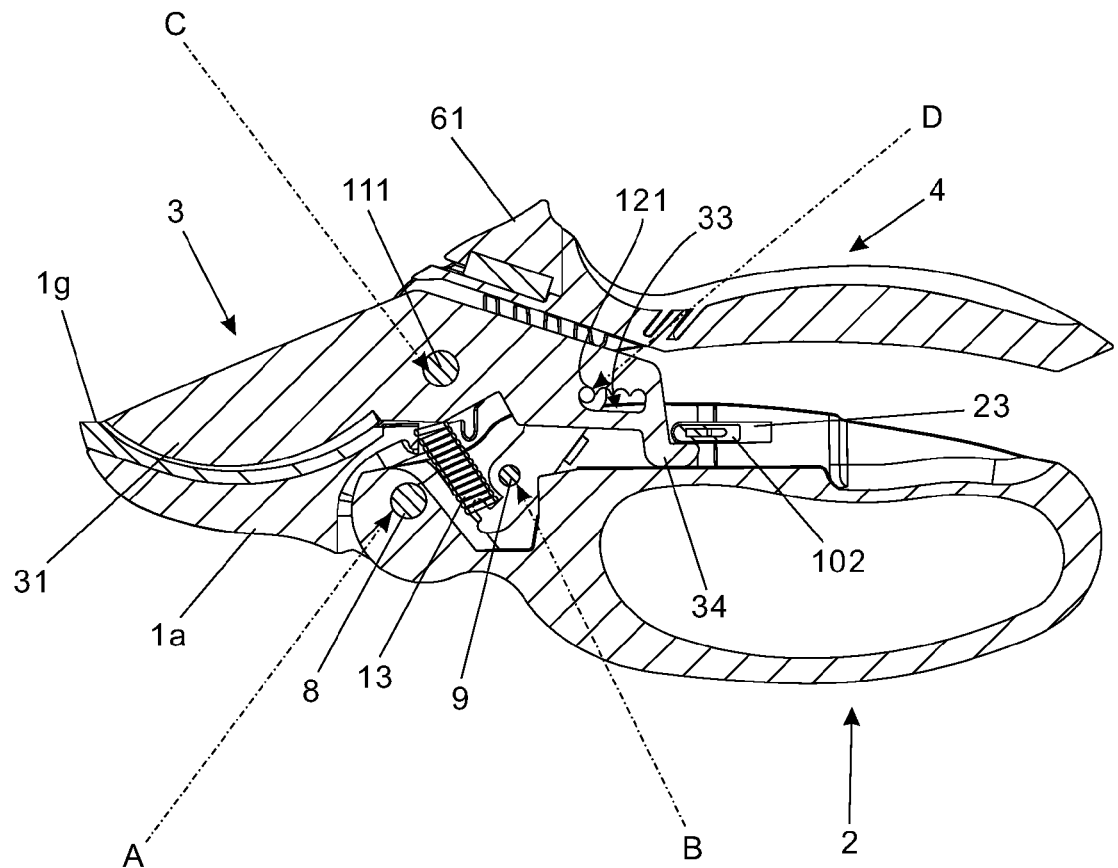
FIG. 7 is an embodiment in a closed state according to the present invention.
Figure 8:
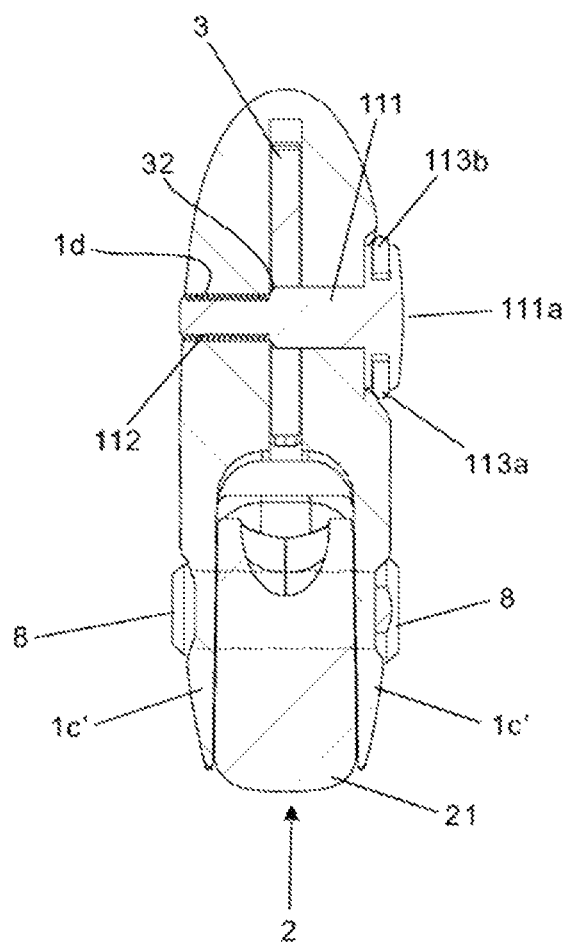
FIG. 8 is a vertical cross sectional view of an embodiment according to the present invention.
Figure 9:
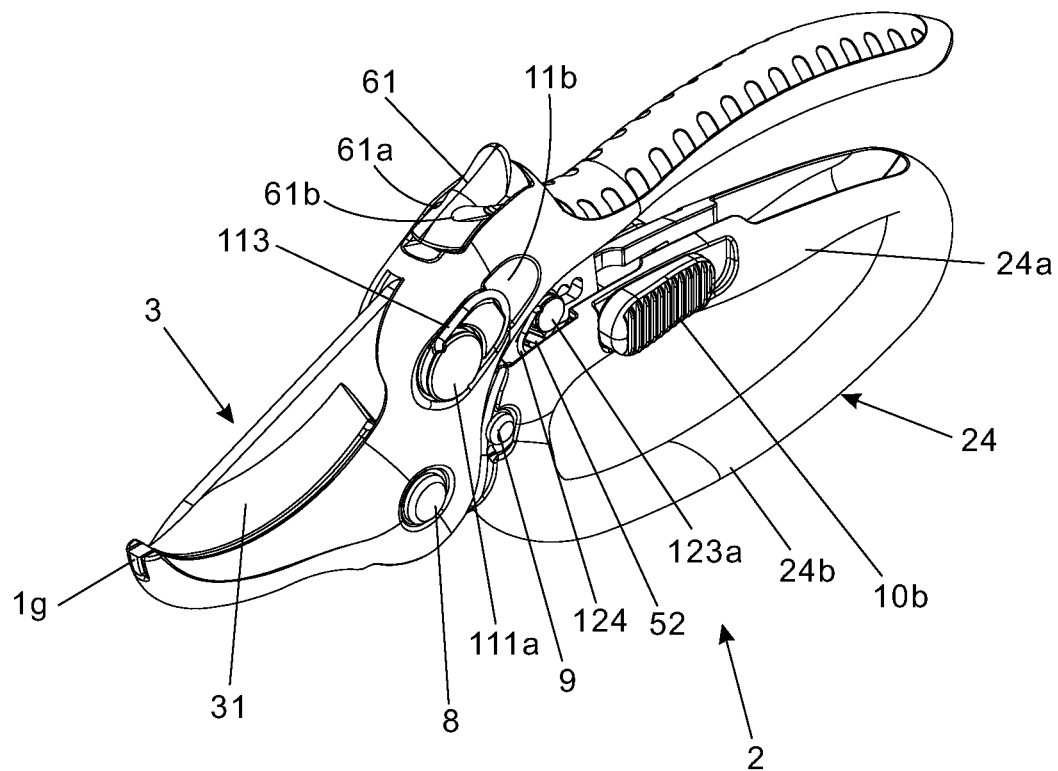
FIG. 9 is a perspective view of an embodiment according to the present invention.

Refer to FIG. 6 and FIG. 7, the lower handle 2 is defined as a rod held by the user's fingers and being pushed toward the upper handle 1 while the upper handle 1 is defined as a rod held by the user's palm and being squeezed toward the lower handle 2. The two ends of the connection part 5 are respectively pivotally connected to the lower handle 2 and the circular part 33 of the blade 3. Where the first axial hole 51a is pivotally connected to the circular part 33 of the blade 3 by the shaft component 121 of the second quick release device 12 is defined as a point of application D. During the operation processes, the user's hand presses the upper handle 1 downward while the lower handle 2 is rotated around the first pivot point A and moved upward. Using the third pivot point C as a fulcrum, the blade 3 is pressed downward by the front end of the holding part 1b. Then the connection part 5 is acted relatively like a link. Thus the shaft component 121 (the point of application D) of the second quick release device 12 in the circular part 33 is switched and moved forward. The blade 3 is further moved toward and close to the jaw part 1a for providing the function of cutting. On the other hand, the way of lifting the blade 3 is as followings. The blade 3 is expanded by the elastic member 13 between the upper handle 1 and the lower handle 2. At the same time, a switching is performed by the connection part 5. The shaft component 121 (the point of application D) of the second quick release device 12 in the circular part 33 is moved backward to expand the upper handle 1 and allow the jaw part 1a and the blade 3 being separated from each other. This is the open state of the cutting tool. The operation processes mentioned above are similar to prior art.

Refer to FIG. 7, a safe lock is revealed. While not in use, the safety lock is used to keep the blade 3 and the jaw part 1a closed. The locking device 10 is slidable in the receiving slot 23. When the mounting projection 102 of the locking device 10 s slides toward the hook part 34 of the blade 3, the mounting projection 102 blocks the hook part 34 of the blade 3 to prevent the blade 3 from rotating. Thus the blade 3, the upper handle 1, and the lower handle 2 are in a closed state.

The present invention features on that the assembly part 2a of the lower handle 2 is sleeved into the hollow space 1c' of the jaw part 1a of the upper handle 1. In other words, the assembly part 2a is enclosed between two walls of the hollow space 1c' of the jaw part 1a of the upper handle 1.

The advantage of such design is in that the first pivot point A of the upper handle 1 and the lower handle 2 is hidden because that the assembly part 2a of the lower handle 2 is enclosed in the two walls of the hollow space 1c' of the jaw part 1a of the upper handle 1. Thus no small debris will enter a gap between the first pivot part 1c and the second pivot part 21. Thus the first pivot point A is always rotated smoothly.

In the above embodiment, there are two quick release devices 11, 12. The quick release device can be used as a pivot of each pivot point of the cutting tool in the present invention for quick and convenient replacement of the blade 3. The blade 3 is pivotally connected to the first pivot part 1*c* of the upper handle 1 and the first axial hole 51*a* of the connection part 5 by the first quick release device 11 and the second quick release device 12 respectively. When users want to replace a new blade 3, the handle 113/124 of the first/second quick release device 11/12 is pulled away from the limiting part 11*a*/the locking part 52 and then the handle 113/124 is rotated clockwise/counterclockwise. Thus the first/second quick release device 11/12 is completely removed from the upper handle 1/the connection part and the blade 3 is released at the same time for assembling the new blade 3 later. Therefore the pivotal connection is achieved by the quick release device of the present invention, without using any other tools.

Figures 1, 10:
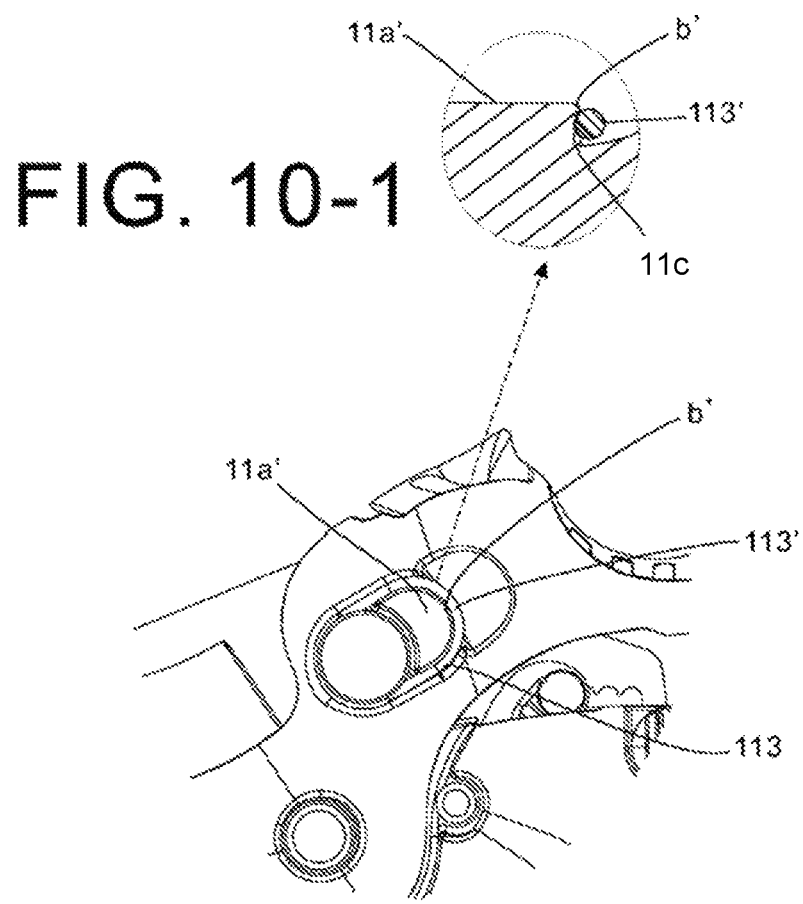
FIG. 10 is a partial enlarged view of a first quick release device of an embodiment according to the present invention.

A further advantage of the present invention is that the handle 113/124 is locked on the limiting part 11*a*/the locking part 52*a* after the first/second quick release device 11/12 being pivoted. That means the first quick release device and the second quick release device 11, 12 are stopped, unable to be rotated any more. Even the cutting device has been used for a plurality of times after a long run, the position where the first/second quick release device 11/12 being pivotally connected will not get loose. The connections between components of the cutting tool are firmly, not easily getting loose or deformed. Once a large counterforce is posed on the cutting tool, the blade 33 is still fastened firmly on the handles. Moreover, the locking part 52 has the same positioning function as the limiting part 11*a* and a projection 11*a*' shown in FIG. 10. That means the locking part 52 is used to limit and keep the handle 113/124 stable. There are a plurality of ways to modify such structure for limiting and positioning. For example, the limiting part 11*a* is formed by two symmetrical slots while the projection 11*a*' is between the two symmetrical slots. In another embodiment, the width of the projection 11*a*' is a bit larger than the width of the handle 113. The width of the locking part 52 is a bit larger than the width of the handle 124 (not shown in figure). A concave part is disposed on an inner bottom end of the projection 11*a*' and of the locking part 52. Due to the elasticity, the handle 113/124 enters the circular slot 111*d* after being expanded by the enlarged part 111*a*. Thus the handle 113 and the handle 124 are respectively mounted into the projection 11*a*' and the locking part 52. Refer to FIG. 10 and FIG. 10-1, a retaining slot 11*c* is extended to a rear end b' of the projection 11*a*'.Thereby the rear end 113' of the handle 113 is mounted and locked in the retaining slot 11*c* on the rear end b' of the projection 11*a*' and the handle 113 is further locked and positioned on the rear end b' of the projection 11*a*'.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A cutting tool, comprising:
    an upper handle which has a first mounting hole and comprises a holding part, a jaw part and a first pivot part;
    a lower handle which comprises a handle part, a second pivot part and a third pivot part;
    a blade which has an insertion hole and comprises a cutting surface, a circular part, and a hook part;
    a connection part which connects said blade with said lower handle, wherein said connection part has an axial hole;
    a first pivot which couples said first pivot part of said upper handle with said second pivot part of said lower handle;
    a second pivot, wherein said second pivot passes through said axial hole of said connection part and is assembled to said third pivot part of said lower handle;
    a first release device which is coupled at said insertion hole of said blade and said first mounting hole of said upper handle to connect said blade to said upper handle, wherein said first release device comprises a shaft component and a handle which is made of elastic material, wherein an integral enlarged part is formed at one end of said shaft component, wherein a circular slot is arranged around a circumference of said enlarged part and two symmetrical holes are radially arranged at said enlarged part, wherein two recesses are arranged at outer ends of said symmetrical holes respectively, wherein said handle is formed with a curved rod comprising two elastic symmetrical assembly parts extended from two curved ends of said handle, wherein said elastic symmetrical assembly parts are respectively engaged with said symmetrical holes to retain said elastic symmetrical assembly parts in said circular slot of said enlarged part, wherein when said handle is swung around said enlarged part to engage said curved ends of said handle with said recesses respectively, said handle is expanded by an outer diameter of said enlarged part, such that said assembly parts are retracted from said symmetrical holes, wherein when said handle is swung around said enlarged part to engage with said circular slot, said assembly parts are moved and turned back to inner ends of said symmetrical holes, and at the same time, outer ends of said assembly parts are limited by the circumference of said enlarged part and located in said circular slot, in such a manner that said handle is rotated to drive said shaft component into and out of said insertion hole and said first mounting hole, wherein a limiting part is disposed on an outer surface of one side of said first mounting hole, wherein when said enlarged part of said shaft component is retained at the first mounting hole, said curved rod of said handle is retained at said limiting part for blocking a rotating movement of said shaft component; and
    a second release device which is constructed to have a same structure of said first release device and a locking part set at a surface of said connection part for positioning said second release device, wherein a rear end of a handle of said second release device is held by said locking part, wherein said connection part further has a second axial hole, wherein said second release device is passed through said second axial hole and connected to said circular part of said blade.

2. The cutting tool, as recited in claim 1, further comprising a locking device, wherein said handle part of said lower handle has an upper receiving part and a lower receiving part integrated with each other, wherein said lower handle has a receiving slot formed at said upper receiving part, wherein said locking device is slidably provided in said receiving slot of said lower handle to lock up said blade, wherein when said upper handle and said lower handle are in a closed state, said hook part of said blade is locked and fixed by said locking device.

3. The cutting tool, as recited in claim 2, wherein said locking device comprises a first pushing block and a second pushing block, wherein a rib part is projecting from one end surface of said first pushing block, wherein a mounting projection having a receiving nozzle is arranged to one end surface of said second pushing block, wherein said rib part is locked and sleeved in said receiving nozzle to lock and fix at said hook part of said blade.

4. The cutting tool, as recited in claim 3, further comprising an assembly block and a cleaner, wherein said upper handle further has a receiving recess, wherein said assembly block is slidably received in said receiving recess and said cleaner is attached under said assembly block for cleaning said blade.

5. The cutting tool, as recited in claim 4, wherein said upper handle further comprises a set of projecting ribs and a set of second projecting ribs arranged in said receiving recess, wherein said assembly block is disposed with a set of slots that is aligned with said second set of projecting ribs, wherein said first set of projecting ribs is arranged for holding said cleaner while said second set of projecting ribs is arranged for positioning said assembly block.

6. A cutting tool, comprising:
an upper handle which has a first mounting hole and comprises a holding part, a jaw part and a first pivot part;
a lower handle which comprises a handle part, a second pivot part and a third pivot part;
a blade which has an insertion hole and comprises a cutting surface, a circular part, and a hook part;
a connection part which connects said blade with said lower handle, wherein said connection part has an axial hole;
a first pivot which couples said first pivot part of said upper handle with said second pivot part of said lower handle;
a second pivot, wherein said second pivot passes through said axial hole of said connection part and is assembled to said third pivot part of said lower handle;
a first release device which is coupled at said insertion hole of said blade and said first mounting hole of said upper handle to connect said blade to said upper handle, wherein said first release device comprises a shaft component and a handle which is made of elastic material, wherein an integral enlarged part is formed at one end of said shaft component, wherein a circular slot is arranged around a circumference of said enlarged part and two symmetrical holes are radially arranged at said enlarged part, wherein two recesses are arranged at outer ends of said symmetrical holes respectively, wherein said handle is formed with a curved rod comprising two elastic symmetrical assembly parts extended from two curved ends of said handle, wherein said elastic symmetrical assembly parts are respectively engaged with said symmetrical holes to retain said elastic symmetrical assembly parts in said circular slot of said enlarged part, wherein when said handle is swung around said enlarged part to engage said curved ends of said handle with said recesses respectively, said handle is expanded by an outer diameter of said enlarged part, such that said assembly parts are retracted from said symmetrical holes, wherein when said handle is swung around said enlarged part to engage with said circular slot, said assembly parts are moved and turned back to inner ends of said symmetrical holes, and at the same time, outer ends of said assembly parts are limited by the circumference of said enlarged part and located in said circular slot, in such a manner that said handle is rotated to drive said shaft component into and out of said insertion hole and said first mounting hole, wherein a limiting part is disposed on an outer surface of one side of said first mounting hole, wherein when said enlarged part of said shaft component is retained at the first mounting hole, said curved rod of said handle is retained at said limiting part for blocking a rotating movement of said shaft component;

a concave part formed at said outer surface of said first mounting hole at a position adjacent to said limiting part, wherein said curved rod of said handle is retained at said limiting part while a rear end of said handle is retained in said concave part; and a second release device which is constructed to have a same structure of said first release device and a locking part set at a surface of said connection part for positioning said second release device, wherein a rear end of a handle of said second release device is held by said locking part, wherein said connection part further has a second axial hole, wherein said second release device is passed through said second axial hole and connected to said circular part of said blade.

* * * * *